OLE K. NILSSEN
INVENTOR.

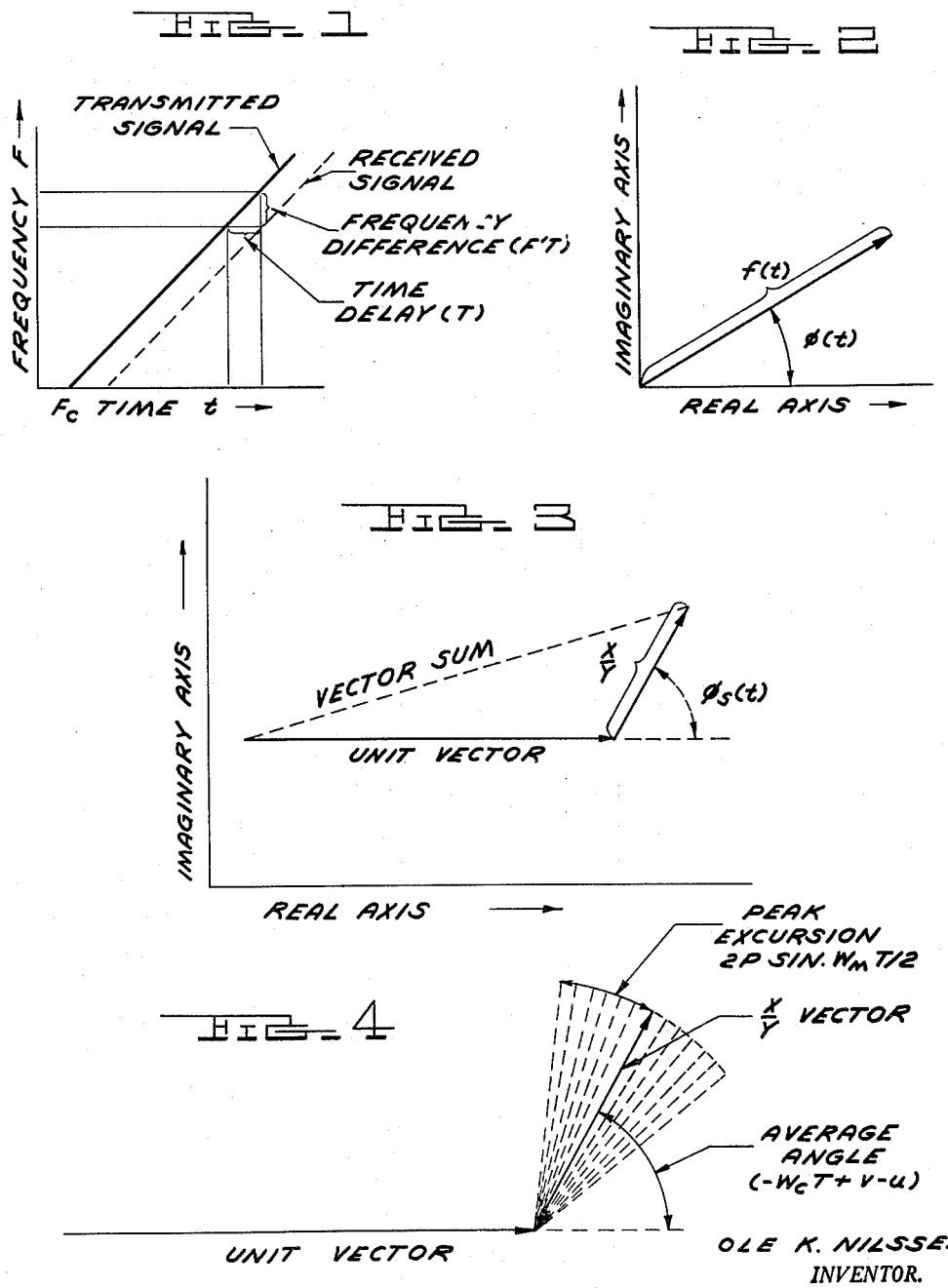

BY J. R. Faulkner
K. L. Zerschling
ATTORNEYS

May 4, 1965

O. K. NILSSEN 3,182,323

CONTINUOUS WAVE RADAR SYSTEM

Filed Dec. 19, 1960

OLE K. NILSSEN
INVENTOR.

BY J. R. Faulkner,
K. L. Zerschling
ATTORNEYS

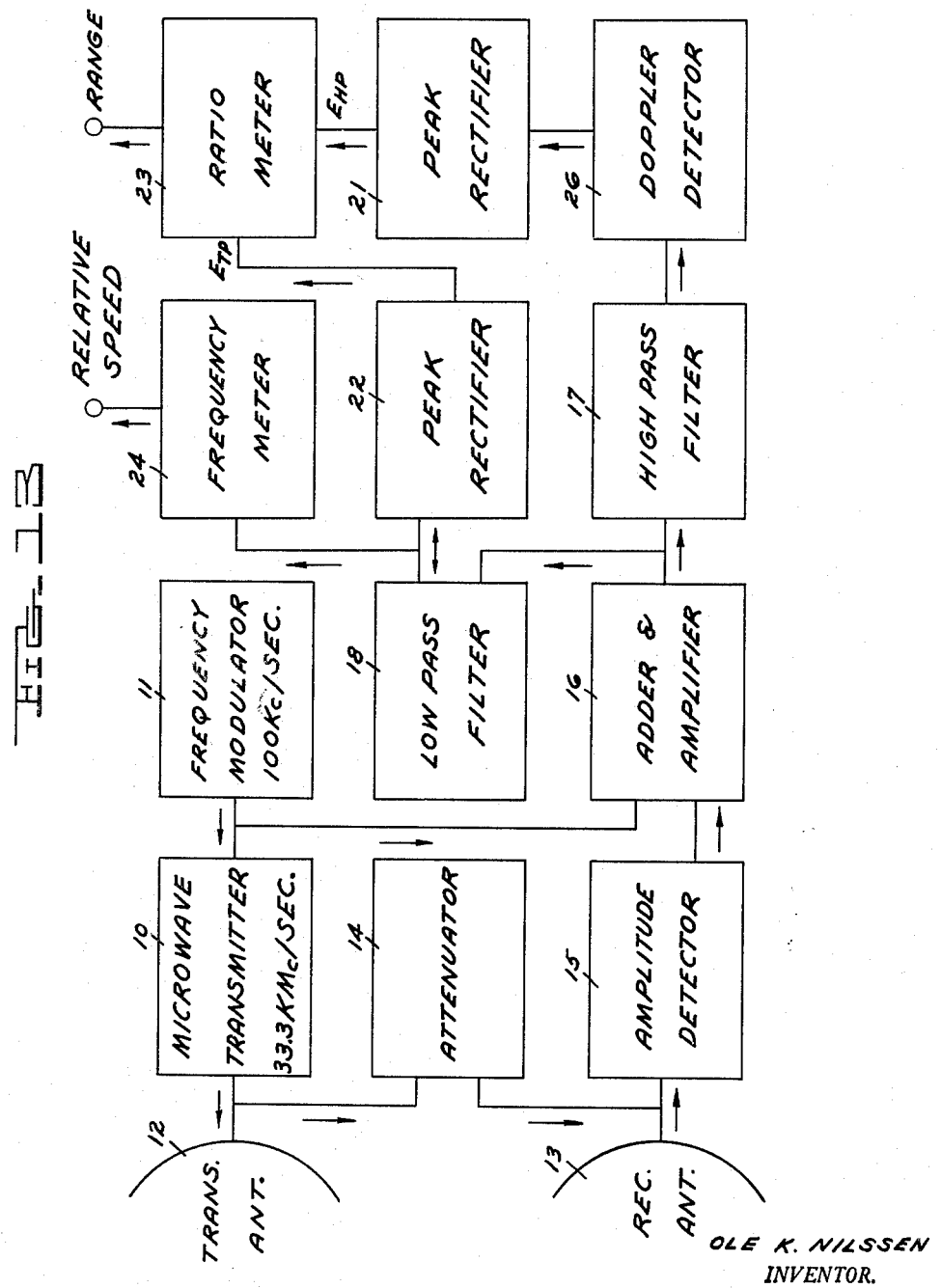

May 4, 1965  O. K. NILSSEN  3,182,323
CONTINUOUS WAVE RADAR SYSTEM
Filed Dec. 19, 1960  8 Sheets-Sheet 7
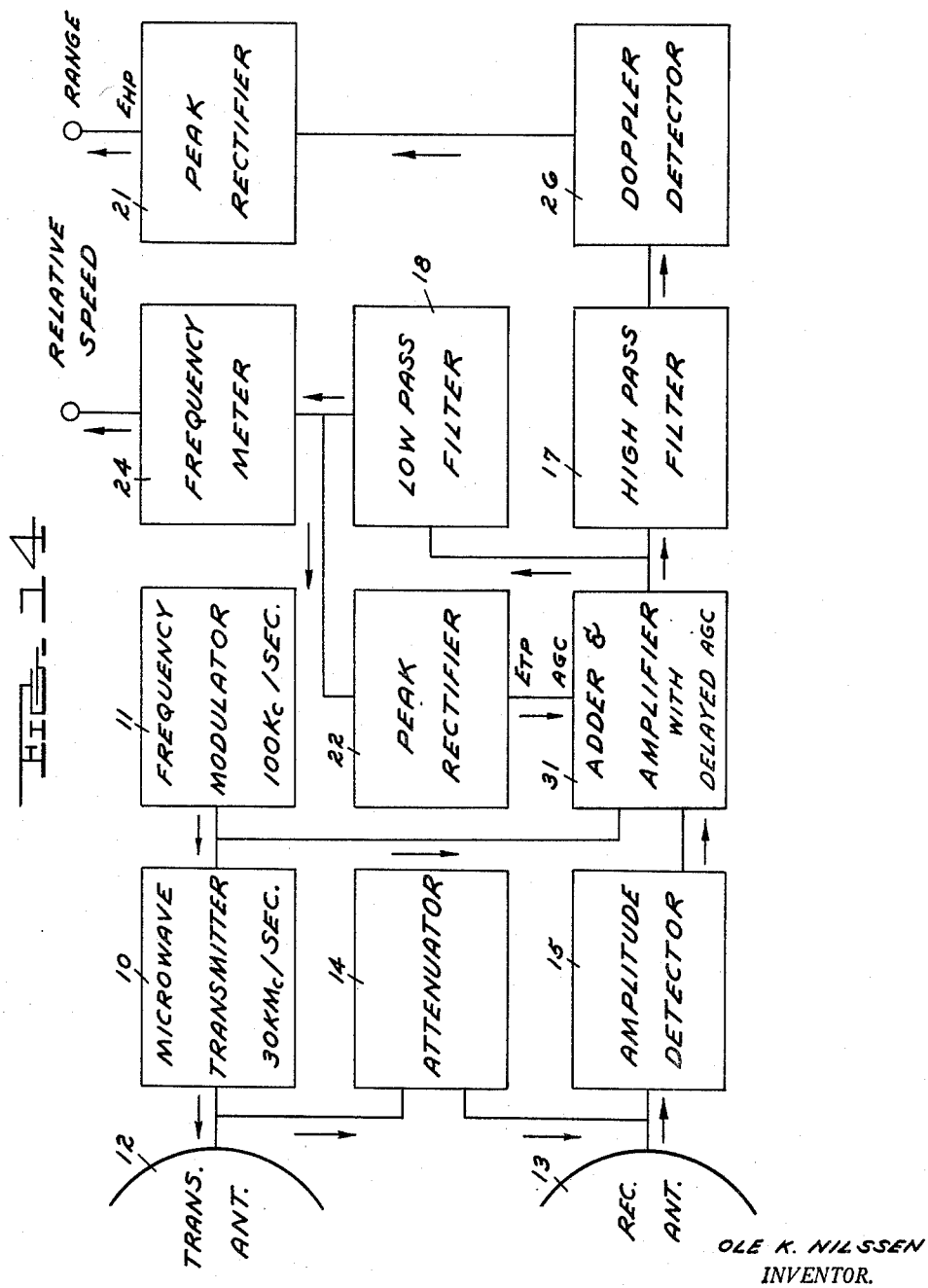
OLE K. NILSSEN
INVENTOR.
BY  J. R. Faulkner
K. L. Zerschling
ATTORNEYS

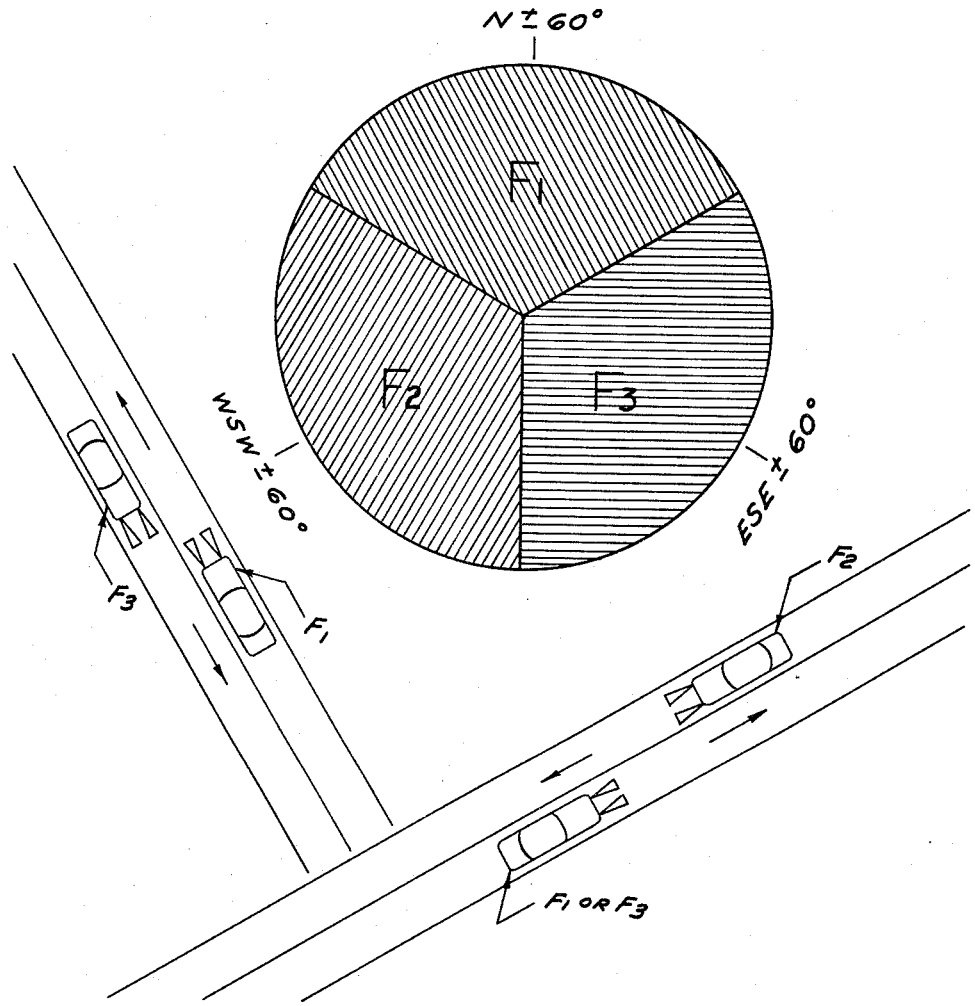

United States Patent Office 3,182,323
Patented May 4, 1965

3,182,323
CONTINUOUS WAVE RADAR SYSTEM
Ole K. Nilssen, Livonia, Mich., assignor to Ford Motor Company, Dearborn, Mich., a corporation of Delaware
Filed Dec. 19, 1960, Ser. No. 76,678
14 Claims. (Cl. 343—9)

This invention relates to a continuous wave radar system and more particularly to a continuous wave radar system that is capable of determining range within very accurate limits without using wide transmission bandwidths.

The present invention is an improvement over the continuous wave radar system disclosed and claimed in my copending application S.N. 744,382, filed June 25, 1958, now Patent Number 3,126,540.

This invention was developed as a part of an automobile collision warning system for determining distance and relative speed between the automobile and an obstacle in its path. It is a well understood fact that one of the most numerous types of accidents occurring with automobiles is the rear end collision. This type of accident is caused either by driver inattentiveness or by bad judgment on the part of the driver in estimating the distance and relative speed between the vehicle operated by the driver and a vehicle located in the same lane ahead of the driver. This invention is capable of providing range rate or relative speed between the two vehicles and is also capable of determining range within extremely accurate limits without resort to wide transmission bandwidths. The principles of the invention are not limited, however, to automobile obstacle detection, but have general utility in continuous wave radar systems for measuring range and range rate between the system and a target.

In the invention, a transmitter signal is angle modulated, i.e., either frequency or phase modulated, at a rate greater than the maximum Doppler frequency expected to be received. The signal from the transmitter and an echo or reflected signal from a target are combined to produce a resultant signal. This resultant signal is applied to a detecting means that yields a signal comprised of a Doppler component and a component due to the angle modulation. Means are connected to the detecting means for measuring the ratio of the peak amplitude of the component due to the angle modulation to the peak amplitude of either the total output signal from the detecting means or the Doppler component thereof. This ratio is a measure of range between the system and a target. Relative speed between the system and the target or range rate, may be determined by measuring the frequency of the Doppler component by any suitable means, for example, a frequency meter.

As will be more completely explained in the detailed description of the invention that follows, the invention has certain very distinct advantages over known continuous wave radar systems. One of these conventional systems measures a beat frequency between a frequency modulated transmitted signal and this same signal reflected from a target. This requires a frequency difference between the transmitted signal and the echo signal to provide a beat frequency sufficiently high that it can be used to provide an indication of range. Where range must be determined within very accurate limits, especially at short ranges, this type of system must employ extremely wide bandwidths. This implies complex and costly equipment and a wide band of frequency requirements.

Another conventional continuous wave radar system compares the phase of a phase or frequency modulated transmitted signal with the phase of an echo signal received from the target. Since the transmitted signal will be many times stronger than the echo signal, this type of system requires effective isolation of the transmitting antenna with respect to the receiving antenna, either by physical separation or by the use of phase shifting networks that cancel out the transmitted signal in the receiving antenna.

The present invention eliminates the disadvantages of the conventional type radar systems discussed above by combining the transmitted signal and the echo or reflected signal and by providing means for determining range and range rate from this combined signal. As discussed above, the continuous wave radar system of this invention is capable of determining range within extremely accurate limits without the use of wide transmission bandwidths.

An object of the present invention is the provision of a continuous wave radar system that is capable of determining range with a high degree of accuracy.

Another object of the invention is the provision of a continuous wave radar system that is capable of determining range and range rate while employing relatively narrow transmission bandwidths.

A further object of the invention is the provision of a continuous wave radar system that is capable of determining range with a high degree of accuracy without employing wide transmission bandwidths.

Still another object of the invention is the provision of a continuous wave radar system that is capable of determining range with a high degree of accuracy at short ranges without employing wide transmission bandwidths.

A further object of the invention is the provision of a continuous wave radar system in which a transmitted signal and an echo or reflected signal are combined to produce a resultant signal that is processed to provide range and range rate information between the system and a target.

Another object of the invention is the provision of a continuous wave radar system that may be employed in an automotive vehicle to provide range and range rate between the vehicle and an obstacle positioned in its path of movement.

A further object of the invention is the provision of a continuous wave radar system that is capable of measuring the relative speed, or range rate, and the range between the system and a target that is moving among a multitude of radar reflectors.

Another object of the invention is the provision of a continuous wave radar system that is capable of measuring relative speed, or range rate, and range between the system and a moving target located among a multitude of radar reflectors when the moving target has a relative speed with respect to the system that is different from the other radar reflectors.

Other objects and attendant advantages of the present invention will become more readily apparent as the specification is considered in connection with the accompanying drawings in which:

FIGURE 1 is a plot showing a transmitted and received signal in a continuous wave radar system in which the frequency of the transmitted signal increases linearly with time;

FIGURE 2 is a plot showing the instantaneous values of the magnitude and phase angle of a transmitted signal in a continuous wave radar system;

FIG. 3 is a plot showing the vector addition of a transmitted and received, or echo signal, in a continuous wave radar system;

FIG. 4 is a plot similar to FIG. 3 but showing in more detail the relationship between the transmitted and received, or echo signal, in a continuous wave radar system;

FIG. 13 is another embodiment of the present invention that is designed to accommodate and correct for a certain amount of incidental amplitude modulation of the transmitted signal;

FIG. 14 is another embodiment of the invention that is also capable of accommodating and correcting for a certain amount of incidental amplitude modulation of the transmitted signal; and, FIG. 15 discloses how the operating frequencies of the radar systems mounted on automotive vehicles could be set in accordance with the direction of travel of the vehicles.

Figure 5:
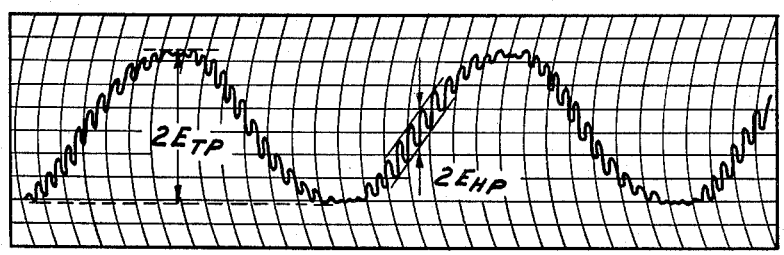
FIG. 5 is a plot of the A.C. component of the amplitude-detected, combined transmitted and received signal of the present invention.

In order to fully understand and appreciate the novel and inventive aspects of the applicant's invention, it is considered that an analysis of one form of continuous wave radar, frequency modulated continuous wave radar, would be helpful.

Frequency modulated continuous wave radar systems operate on the principle of frequency modulating a transmitted signal. The frequency of an echo signal received from a target will be different from the frequency of the transmitted signal at any instant of time, due to the round trip distance between the system and the target. This difference in frequency permits a measurement of range to the target.

Frequency modulated radar may be explained more explicitly as follows: Assume that the frequency of the transmitted signal is made to increase linearly with time, as indicated by the solid line in FIG. 1. The slope of this line is the time rate of change of frequency, $dF/dt$ or $F'$. Thus, the instantaneous value of the transmitter frequency may be written as $$F = F_c + F't \qquad (1)$$

The signal received after reflection from a target will be delayed by an amount T, implying that its frequency is $$F_r = F_c + F'(t-T) \qquad (2)$$

The corresponding frequency difference between transmitted and received signals will be $$F - F_r = F'T \qquad (3)$$

As may be seen, this frequency difference is a direct function of $F'$ and T.

A frequency difference between two signals of even widely different strengths is capable of measurement, therefore, knowing the value of $F'$, T can be obtained. The time delay T is related to range R in the following way:

$$R = c\frac{T}{2} \qquad (4)$$

where $c$ is the speed of light ($10^9$ feet/sec.). The factor of ½ appears since T is the round trip delay, whereas R is the one way distance.

The bandwidth requirements of a frequency modulated radar system are determined by the total frequency sweep of the transmitter signal, which in turn depends upon how many beat-cycles are required to establish a sufficiently accurate reading of the unknown difference frequency $F'T$, as given by Equation 3.

In conventional frequency modulate radar, this reading is obtained by applying the signal of unknown frequency to a counter, the output of which will be a number $$n = F'Tt \qquad (5)$$

Consequently, the delay may be expressed as $$T = \frac{n}{F't} \qquad (6)$$

Then, by combining Equations 4 and 6 the following equation for range may be derived:

$$R = \frac{cn}{2F't} \qquad (7)$$

However, counters generally cannot count fractions of one cycle. Thus there exists a possibility of error corresponding to one count. In terms of uncertainty of range R, this is $$\Delta R = \frac{c}{2F't} \qquad (8)$$

which is often referred to as the fixed error of frequency modulated radar. As can be seen, the error is inversely proportional to time, so that the longer the counting goes on, the smaller the error. For a given uncertainty, Equation 8 may be written as $$F't = \frac{c}{2\Delta R} \qquad (9)$$

In continuous wave radar systems employed for comparatively short range applications, for example, obstacle detection for automobiles, it seems reasonable to require a maximum uncertainty of 1 meter (3 feet) at short ranges. When this value is substituted for $\Delta R$ in Equation 9, the resulting frequency deviation, which is approximately equivalent to the bandwidth, turns out to be $1.5 \times 10^8$ c.p.s. This result indicates a bandwidth that requires complex equipment and a large operating spectrum.

An alternative way of obtaining range from the relation indicated by Equation 7, is to measure the time $t_0$ that it takes for the counter to count a predetermined number of beat-cycles. If, as a minimum limit, this number must be at least one, the expression for R is $$R = \frac{c}{2F't_0} \qquad (7a)$$

No fixed error would be associated with such a method. The bandwidth requirements would be less severe than with conventional frequency modulated radar, and can be determined by choosing the minimum range to be measured as 3 meters or 10 feet. By inserting this value for R in Equation 7a, there results: $F't_0 = 5 \times 10^7$ c.p.s. This bandwidth is less than that of conventional frequency modulated radar, but is still very large from the standpoint of equipment complexity and spectrum requirements.

Referring to Equation 7, it can be appreciated that if a small fraction of one cycle or count could be recognized and measured, it would be possible to reduce the required frequency sweep by a substantial amount. This is accomplished by the embodiments of the invention described subsequently, but in order to explain the principles involved, it is considered that a more rigorous analysis of continuous wave radar should be set forth.

The transmitted signal in a radar system may be expressed as a sinusoid $$S(t) = f(t) \cdot e^{j\phi(t)} \qquad (10)$$

where, as shown in FIG. 2, $f(t)$ represents the instantaneous amplitude of a vector at an angle $\phi(t)$ in the complex plane. The echo signal from a single target may then be written as $$S_e(t) = a \cdot f(t-T) \cdot e^{j\phi(t-T)} \quad (11)$$

where T is the echo delay, and $a$ is some attenuation factor. This factor is generally complex and variable with range and target characteristics.

The signal reaching the radar detector is actually the sum of two signals:

$$S_s(t) = b \cdot S(t) + S_e(t) \quad (12)$$

where $b$ indicates the fraction of the transmitted signal that reaches the detector via a direct path, i.e., intentional or unavoidable leakage, and is assumed to be a known complex constant.

In the type of continuous wave radar to be analyzed, there is no amplitude modulation of the transmitter signal. This implies that $f(t)$ in Equation 10 is a constant. Without losing generality, this constant may be chosen to be $1/b$. Therefore, from Equations 10, 11, and 12, the composite signal at the detector of the radar system may be written as $$S_s(t) = b\frac{1}{b}e^{j\phi(t)} + a\frac{1}{b}e^{j\phi(t-T)}$$

or $$S_s(t) = e^{j\phi(t)} - \left[1 + \frac{a}{b}e^{j[\phi(t-T)-\phi(t)]}\right] - \quad (13)$$

As previously indicated, both $a$ and $b$ are complex, and may be expressed as follows:

$$a = xe^{jv} \quad (14)$$

and $$b = ye^{ju} \quad (15)$$

where $x$ and $y$ represent the relative strengths of the reflected and direct signals respectively; $v$ corresponds to a shift in angle caused by, and taking place at the target ($v = \pi$ radians or 180° when target is a perfect reflector); and $u$ is a measure of the phase shift of the direct signal.

With equations 14 and 15 in mind, Equation 13 may be rewritten as $$S_s(t) = e^{j\phi(t)} - \left[1 + \frac{x}{y}e^{j[\phi(t-T)-\phi(t)+v-u]}\right] - \quad (16)$$

If $e^{j\phi(t)}$ is regarded as a reference, $S_s(t)$ may be interpreted as a unit vector to which is added another vector of length $x/y$ at an angle of $$\phi_s(t) = \phi(t-T) - \phi(t) + v - u \quad (17)$$

This addition is illustrated in FIG. 3.

It is apparent that the information on echo delay is contained in $\phi_s(t)$. However, presently conceivable detectors are not able to discriminate between values of $\phi_s(t)$ that differ by whole multiples of $2\pi$ radians. This fact eliminates the possibility of obtaining range by a direct measurement of angle, as long as the range to be measured is variable over several wavelengths of the radar signal. A separate reason to discourage such an approach is evident in that $v$ is not strictly constant, but may vary somewhat as a function of the type of target.

From this analysis, it can be deduced that some sort of dynamic method of measurement has to be employed. This implies a frequency or phase modulation of the radar signal. This modulation may be chosen to be periodic, even sinusoidal, without losing generality; thus $$\phi(t) = w_c t + P \sin w_m t \quad (18)$$

where $w_c$ is the angular speed of the carrier signal, P is the peak phase excursion, and $w_m$ is the angular speed of the modulating signal.

Equation 16 may now be written as $$S_s(t) =$$

$$e^{j\phi(t)} - \left[1 + \frac{x}{y} e^{j[w_c(t-T)+P\sin w_m(t-T)-w_c t-P\sin w_m t+v-u]}\right] -$$

or $$S_s(t) =$$

$$e^{j\phi(t)} - \left[1 + \frac{x}{y} e^{j\left[2P \sin w_m \frac{T}{2} \cos\left(w_m t - w_m \frac{T}{2}\right) - w_c T + v - u\right]}\right] - \quad (19)$$

If this signal is applied to a peak linear amplitude detector with a suitable response time, the resulting output will be $$E(t) = \left|1 + \frac{x}{y} e^{j\left[2P \sin w_m \frac{T}{2} \cos\left(w_m t - w_m \frac{T}{2}\right) - w_c T + v - u\right]}\right| \quad (20)$$

If the signal expressed in Equation 19, however, is applied to a square law detector and the D.C. component is eliminated by conventional means, such as a capacitor, the output of the detector will have a wave form shown in FIGURE 5 and may be approximated by the expression $$E_{ac}(t) =$$

$$\frac{x}{y} \cos\left[2P \sin w_m \frac{T}{2} \cos\left(w_m t - w_m \frac{T}{2}\right) - w_c T + v - u\right] \quad (20a)$$

This is the same as Equation 35 that is discussed in column 9 in relation to a specific embodiment of the invention.

Another way of stating this is that the output from the detector will represent the length of the vector sum indicated in FIG. 3. For this to be so, however, it is necessary to assume that $x/y$ is less than unity, or that $x$ is smaller than $y$. This means that the echo signal must be weaker than the direct (leakage) signal, which is a reasonable assumption in a practical radar system of the continuous wave type.

As may be seen from Equation 20, it is necessary that $$w_m \frac{T}{2}$$

be less than $\pi/2$ radians, or 90°, in order to avoid ambiguous results. This means that $$F_m < \frac{1}{2T} \quad (21)$$

where $F_m$ is the modulation frequency in cycles per second, corresponding to the angular velocity $w_m$.

An analysis of Equation 20 may best be carried out with the help of a vector diagram as shown in FIG. 4. There, the smaller vector of length $x/y$, the $x/y$ vector, represents the echo signal. The unit vector represents the direct signal. For any given range, the average angle of the $x/y$ vector will be $(-w_c T + v - u)$. About this average angle there are sinusoidal variations with peak excursions of $$\left(2P \sin w_m \frac{T}{2}\right)$$

at a frequency and phase corresponding to $$\cos\left(w_m t - w_m \frac{T}{2}\right)$$

It is evident that complete information concerning echo delay is contained in both the amount of the angular deviation as well as in its timing with respect to that of the modulating signal.

In conventional frequency modulated radar the information concerning echo delay is extracted from the amount of deviation by counting how many complete revolutions are made by the $x/y$ vector during one excursion. Any fractional revolutions are ignored, which implies a possibility of error corresponding to one revolution of the $x/y$ vector. To make this error small, a large number of revolutions must be created. This means that a large bandwidth is required.

The continuous wave radar system of this invention also relies upon measuring the amount of angular deviation around the average angle of $(-w_cT+v-u)$. The difference lies in that the maximum excursion is made quite small, so small in fact, that at any range of interest the resulting peak angular excursion of the $x/y$ vector stays well below $\pi/2$ radians.

The average angle $(-w_cT+v-u)$ is going to vary as range changes, causing a rotation of the $x/y$ vector at a rate of $$\frac{d(-w_cT+v-u)}{dt} = -w_c\frac{dT}{dt} + \frac{dv}{dt}$$

Since, for all practical purposes, $dv/dt$ may be considered negligible with respect to $$w_c\frac{dT}{dt}$$

the average angular speed of the $x/y$ vector will be $$\Omega = -w_c\frac{dT}{dt} \quad (22)$$

or $$F_d = -F_c\frac{dT}{dt} \quad (23)$$

which, in connection with Equation 4 gives $$F_d = -\frac{2F_c}{c}\frac{dR}{dt} \quad (24)$$

where $F_d$ represents the Doppler frequency.

It is the fact that the average angle of the $x/y$ vector changes with range, that provides a direct opportunity for measuring the excursions of the sinusoidal angular oscillations previously described.

Assume that the Doppler frequency is low compared to the modulating frequency. This implies that on the average, the $x/y$ vector rotates slowly, but that superimposed on this slow motion is a rapid angular oscillation with peak excursions of $$\left(2P \sin w_m\frac{T}{2}\right)$$

As stated before $$2P \sin w_m\frac{T}{2} < \frac{\pi}{2} \quad (25)$$

Figure 6:
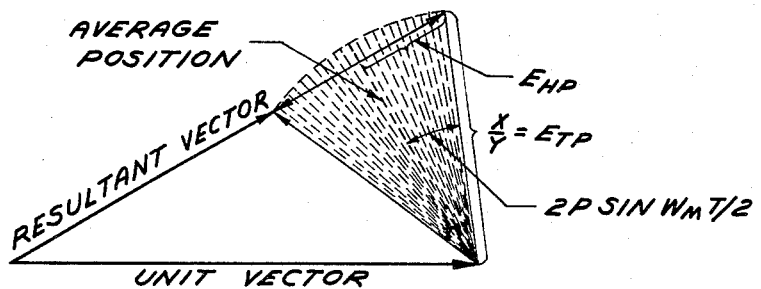
FIG. 6 is a vector diagram explaining the origin of the signal shown in FIG. 5.

Under this condition, the resulting amplitude-detected signal will look like that of FIG. 5. Here, the low frequency component corresponds to the Doppler signal, and the high frequency component is due to rapid angular oscillations associated with the modulation signal. From FIG. 6 it can be understood that the maximum high frequency modulation of the amplitude occurs whenever the average position of the $x/y$ vector is perpendicular to the resultant vector. In this case, the peak value of the high frequency component of the detector output will be $$E_{HP} = \frac{x}{y} \sin\left(2P \sin w_m\frac{T}{2}\right) \quad (26)$$

as long as $$\left(2P \sin w_m\frac{T}{2}\right)$$

is smaller than $\pi/2$ radians. For any value of $$\left(2P \sin w_m\frac{T}{2}\right)$$

larger than this, $E_{HP}$ will be constant and equal to $x/y$.

Furthermore, $E_{TP}$, the peak value of the total alternating voltage at the output of the detector will always correspond directly to the length of the $x/y$ vector, $$E_{TP} = \frac{x}{y} \quad (27)$$

After appropriate filtration and peak rectification, both $E_{HP}$ and $E_{TP}$ are available as unidirectional quantities. Combining Equations 26, 27, and 4 gives $$\frac{E_{HP}}{E_{TP}} = \sin\left(2P \sin w_m\frac{R}{c}\right) \quad (28)$$

or, as an explicit function of range, $$R = \frac{c}{w_m} \arcsin\left(\frac{1}{2P} \arcsin\frac{E_{HP}}{E_{TP}}\right) \quad (29)$$

Figure 7:
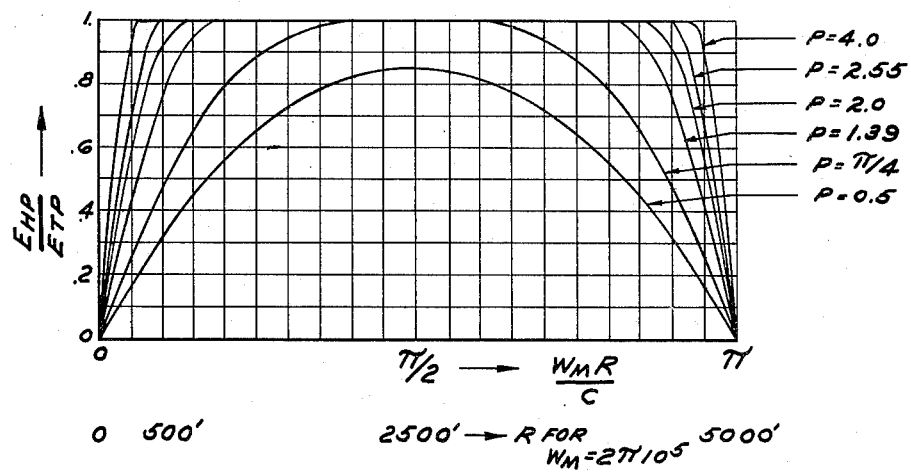
FIG. 7 is a plot of the ratio of the voltages $E_{HP}$ to $E_{TP}$ as a function of range.

Plotting the ratio $E_{HP}/E_{TP}$ as a function of $w_mR/c$ for various values of P, gives a family of curves as shown in FIG. 7. The flat portions of these curves, where the ratio is unity, corresponds to the condition that $$\left(2P \sin \frac{w_mR}{c}\right)$$

is larger than $\pi/2$ or 90°. For a given value of $w_m$, the abscissa may be calibrated directly in units of distance. For example, if $w_m = 2\pi 10^5$ radians per second ($F_m = 100$ kc./sec.), the range calibration will be as indicated in FIG. 7. If the maximum range of interest is 500 feet, as is the case for automobile obstacle detection, it can be seen that ambiguities may arise for targets beyond 4500 feet. However, since the echo signal strength from obstacles at 4500 feet and beyond will be extremely weak compared to that at 500 feet, it is quite simple to make the radar system recognize this condition by proper adjustment of the detector threshold.

The maximum range that can be measured without ambiguity depends upon the angular speed of modulation, $w_m$, as well as the amount of phase modulation, P. The exact relationship may be seen quite clearly in FIG. 7. For $F_m = 100$ kc./sec. and a range limit of 500 feet, the maximum allowable phase-modulation can be found from Equation 25 to be 2.55 radians. This amount of modulation makes the $E_{HP}/E_{TP}$ ratio reach unity at exactly 500 feet. However, with $P = 2.55$ radians, the range discrimination at maximum distances is rather poor due to the unfavorable slope of the voltage ratio versus distance curve in that range. This slope, and thereby the range discrimination may be maximized at 500 feet through appropriate differentiations of Equation 28. The result of maximizing the slope at 500 feet yields a value for $P = 1.39$ radians, which gives the following expression for range ($F_m = 100$ kc./sec.):

$$R = 1566 \arcsin\left(0.36 \arcsin\frac{E_{HP}}{E_{TP}}\right) \text{ (in feet)} \quad (30)$$

Figure 8:
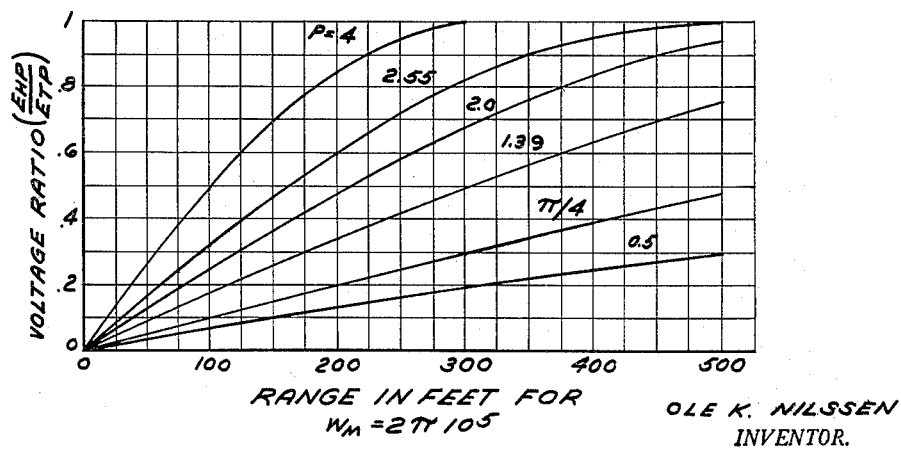
FIG. 8 is similar to FIG. 7 but replotted to an expanded horizontal scale for range.

The family of curves shown in FIG. 7 is replotted to an expanded horizontal scale in FIG. 8 for $w_m = 2\pi 10^5$ radians/sec. It should be noted that for low values of modulation (for example when $P = 1.39$ radians), the resulting curve is practically a straight line. This fact may be an advantage in connection with subsequent data processing.

For illustrative purposes, it might be of interest to compute the range corresponding to the signal shown in FIG. 5. Measurements directly from the depicted wave indicate that $2E_{HP} = 1.6$ divisions and $2E_{TP} = 6.4$ divisions. For the case when $P = 1.39$ and $F_m = 100$ kc./s., Equation 30 may be used, giving $$R = 1566 \arcsin\left(0.36 \arcsin\frac{1.6}{6.4}\right) = 142 \text{ feet} \quad (31)$$

The same result may also be obtained from the $P = 1.39$ curve of FIG. 8.

The transmission bandwidth of the above described radar system can be found from Equation 18. The instantaneous angular speed of the radar signal is $$\frac{d\phi(t)}{dt} = w_c + w_mP \cos w_mt \quad (32)$$

This corresponds to an "instantaneous" frequency of $$F = F_c + F_mP \cos w_mt \quad (33)$$

For $F_m=100$ kc./s. and $P=1.39$ radians, the peak frequency deviation is $$F_mP=1.39\times 100 \text{ kc./s.}=139 \text{ kc./s.} \quad (34)$$

According to frequency modulation theory, this corresponds to a transmissioin bandwidth of approximately 500 kc./s., i.e., less than that of conventional radar by a factor of more than 100.

Throughout the previous discussion, it has been assumed that the frequency of modulation is higher than the maximum Doppler signal frequency expected to be received by the system. Although by no means so limited, a ratio of ten to one is considered to be entirely satisfactory. For a given frequency of modulation, this requirement automatically puts an upper limit on the carrier frequency of a radar system employed in automobile obstacle detection, since the other variable determining Doppler frequency, namely relative speed, is essentially fixed by present automobile capabilities.

In automobile obstacle detection, the maximum relative speed of interest may be assumed to be 100 miles per hour or 45 meters per second. This is assuming that the radar system is to be employed to detect obstacles in the future path of the vehicle, such as automobiles traveling in the same direction and in the same lane. Substituting this value for $dR/dt$ in Equation 24, and making $F_{d_{max}}=10$ kc./s. (i.e. one-tenth of $F_m$), gives a maximum carrier frequency of $$F_{c_{max}}=3.33\times 10^{10} \text{ c.p.s.}$$

The wave length corresponding to this frequency is 0.9 cm. This wave length is sufficiently short so that an antenna that can be placed upon an automotive vehicle, for example, an antenna having a width of three feet, will have sufficient directivity at the maximum range envisioned, 500 ft.

A block diagram of a continuous wave radar system constructed in accordance with the principles discussed above is shown in FIG. 9.

In this figure, there ies shown a microwave transmitter 10 that is angle modulated, either frequency or phase modulated, by a modulator 11 which in this case has been designated as a frequency modulator. The modulated transmitter signal is fed from the microwave transmitter 10 to a transmitting antenna 12 where it is projected into space and is then reflected from a target to produce an echo or reflected signal at a receiving antenna designated by the numeral 13. The transmitted signal from the microwave transmitter 10 is also fed through an attenuator 14 to be combined with the reflected signal present at the receiving antenna 13. Thus, the total signal at the input of amplitude detector 15 is a composite signal and is mathematically described by Equation 19.

The amplitude detector 15 detects this signal and yields a Doppler component and a component due to the modulation and rejects the carrier component. If it is assumed that a peak linear detector is employed the output from the detector is a voltage mathematically described by Equation 20. However, if a square law detector is employed and the direct component of the signal is eliminated by conventional means, such as a capacitor, the output of the square law detector will have a waveform shown in FIG. 5 and may be approximated by the expression $$E_{ac}(t) = \frac{x}{y}\cos\left[2P\sin w_m\frac{T}{2}\cos\left(w_m t - w_m\frac{T}{2}\right) - w_c T + v - u\right] \quad (35)$$

Figure 9:
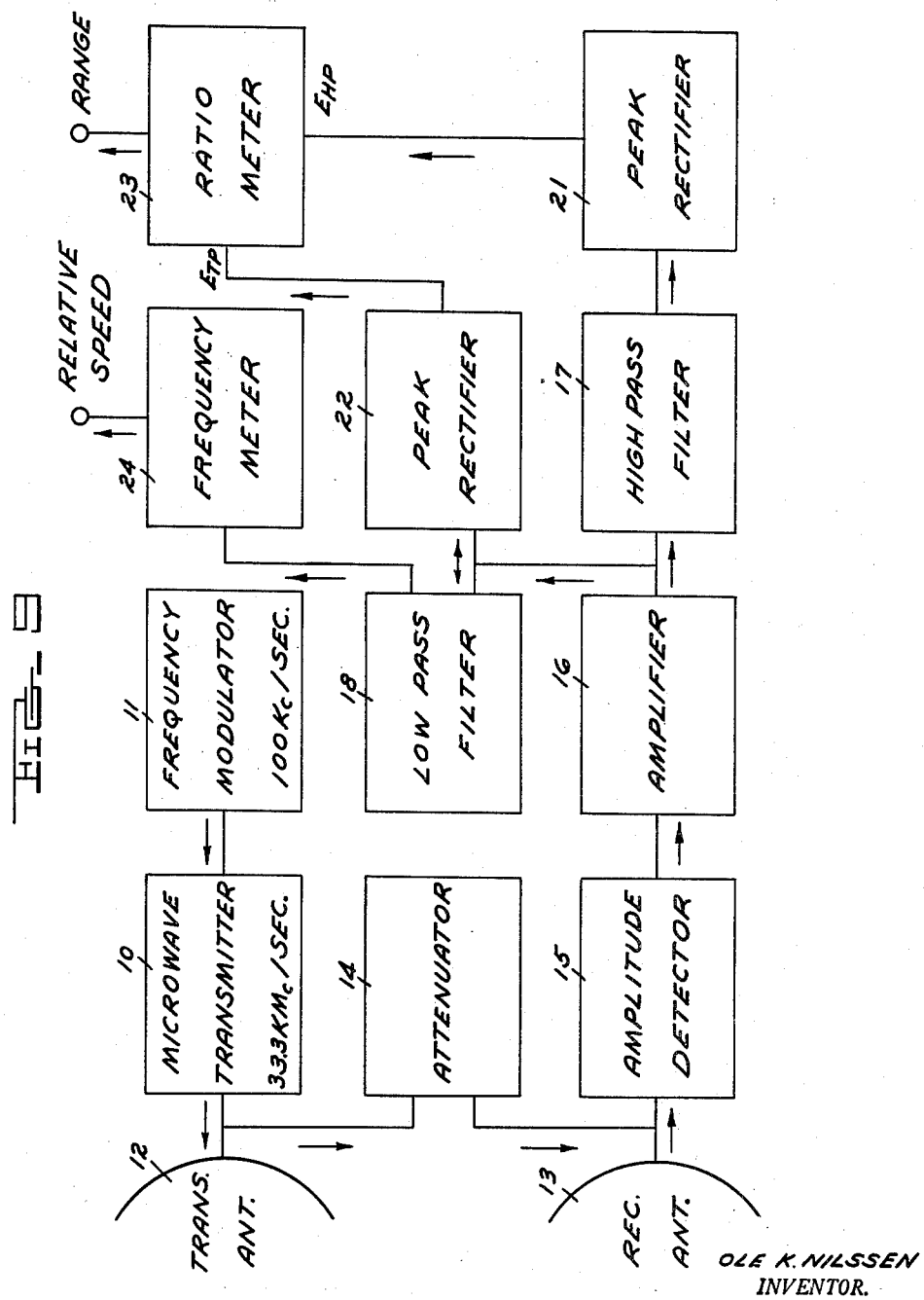
FIG. 9 is a block diagram of one embodiment of the present invention.

The amplitude detector 15 may be a standard diode square law detector employing a microwave diode 1N53. The time constant of this detector must be large with respect to the carrier, but small with respect to the highest anticipated harmonic of the modulation frequency. It can be appreciated that these time constant relationships can easily be obtained since the carrier frequency of the embodiment show in FIGURE 9 is 33.3 kilomegacycles while the modulation frequency is 100 kilocycles. Thus, the carrier frequency is several thousand times higher than the hundredth harmonic of the modulating frequency.

This approximation is good as long as $x$ is very much smaller than $y$ which would be the case in a practical radar system since $x$ represents the reflected signal and $y$ represents the signal fed directly from the transmitter 10 to the amplitude detector through the attenuator 14. The output from the amplitude detector may be suitably amplified by an amplifier 16.

Figure 10:
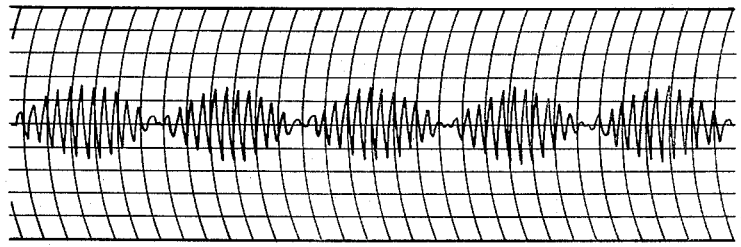
FIG. 10 is a plot of a signal present at the output of the high pass filter shown in FIG. 9 assuming no incidental amplitude modulation of the signal transmitted by the system of FIG. 9.

Means are provided for measuring the ratio of the peak amplitude of the component due to the modulation to the peak amplitude of the total signal. This ratio, as previously explained, is a measure of the range between the system and the target. This means is described below and includes a high pass filter 17 connected to the amplifier that will pass only that component due to the modulation. A low pass filter 18 also connected to amplifier 16 that will pass only the Doppler component, as will be subsequently described. The output from the high pass filter 17 is a signal having a waveform as shown in FIG. 10, and this signal is fed to a peak rectifier 21 that determines the peak amplitude of the signal shown in FIG. 10. This peak rectifier should have a time constant that is long compared to the period of the lowest Doppler frequency encountered. The resulting unidirectional voltage obtained from this peak rectifier is a direct measure of $E_{HP}$ as defined in Equation 26.

The output from the amplifier 16, the composite signal shown in FIG. 5, is also applied to a second peak rectifier 22 that also has a long time constant compared to the period of the lowest Doppler frequency expected to be encountered. The output from the peak rectifier 22 will be a unidirectional voltage that is a direct measure of $E_{TP}$ as defined in Equation 27. The unidirectional outputs of the peak rectifiers 21 and 22 are then fed to a ratio meter 23, the output of which will be a measure of the $E_{HP}$ to the $E_{TP}$ voltage ratio. The reading on this meter may be calibrated directly in range by the application of Equation 29. Over given ranges, the ratio of $E_{HP}$ to $E_{TP}$ may vary substantially linearly with range for selected values of $W_m$ and $P$. This can best be seen by an inspection of FIG. 8.

As stated previously, the output from the amplifier 16 is also fed to a low pass filter 18 that will pass only the Doppler component of the composite signal shown in FIG. 5. A frequency meter 24 is connected to the output of the low pass filter 18. The low pass filter 18 and the frequency meter 24 thus comprise a means for measuring the frequency of the Doppler component and thereby furnish a means for measuring the range rate or relative speed between the system and a target. The reading on this frequency meter 24 may be calibrated directly in terms of speed. The information concerning range and relative speed may then be suitably processed to provide a warning in case of a potential accident siutation, if the radar system is employed as an obstacle detector in an automotive vehicle.

It was assumed during the discussion and description of the block diagram of FIG. 9 that the repetition rate of modulation of the transmitter signal was greater than the maximum Doppler frequency expected to be received. By way of example, if the radar system shown by the block diagram in FIG. 9 is employed in an automobile obstacle detection system, the carrier frequency may be selected as 33.3 kmc./sec. and this would produce a transmitted wave having a length on the order of 0.9 centimeter. This wave length is sufficiently short that the antennas employed may have the desired directivity and size for use with automotive vehicles. With this selected carrier frequency and with the relative velocities expected between automotive vehicles traveling in the same lane, the maximum Doppler frequency that may be expected to be received would be on the order of 10 kc./sec. With this maximum Doppler frequency expected the repetition rate or frequency of modulation may be selected as 10 times this value or 100 kc./sec.

It will also be understood by those skilled in the art that the transmitting antenna and receiving antenna may be combined as one unit, and that a circulator or power divider may be connected to the transmitter, the combined antenna, and amplitude detector to produce the same result as the system shown in FIG. 9, and described above.

As was pointed out in the theoretical discussion of the continuous wave radar system of this invention, it was assumed that there was no amplitude modulation of the transmitter signal. In actual practice, however, there may be a certain amount of incidental amplitude modulation of the transmitter signal when this signal is frequency or phase modulated. As long as this incidental amplitude modulation is small, it will only have the effect of adding a certain amount of steady state signal at the modulating frequency to the detected signal as expressed by Equation 20, or as illustrated in FIG. 5. The effect of this is the modification of the $E_{HP}$ and the $E_{TP}$ voltages that are applied to the ratio meter 23 to determine range.

For all practical purposes, in the system contemplated for automobile obstacle detection that has a 500 foot maximum range, the unidirectional voltage $E_{TP}$ may be considered equal to the peak voltage of the Doppler component. This means that all signals at 100 kc./sec., the modulation frequency, or above, may be filtered and rejected before applying the Doppler component to a peak rectifier in order to obtain $E_{TP}$. Obtained in this way, $E_{TP}$ will be independent of any small amount of incidental amplitude modulation.

Figure 11:
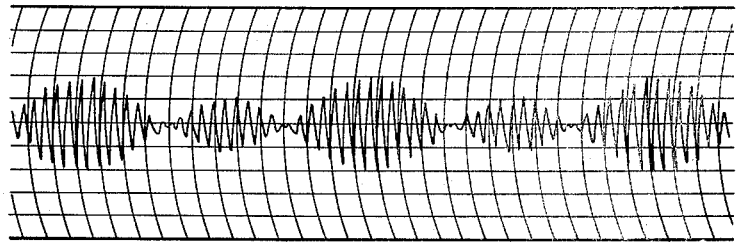
FIG. 11 shows a signal that will be present at the output of the high pass filter shown in FIG. 9 if the signal transmitted by the system shown in FIG. 9 contains incidental amplitude modulation.
Figure 12:
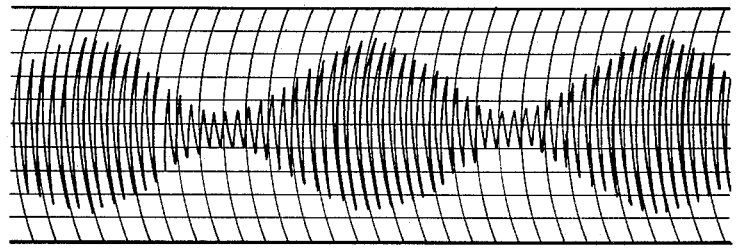
FIG. 12 shows a signal that is present at the output from the high pass filter of the system shown in FIGS. 13 and 14.

The $E_{HP}$ voltage, however, cannot be obtained as directly, since the signal of FIG. 10 from which $E_{HP}$ is derived will be modified by the incidental amplitude modulation to have a wave form such as that shown in FIG. 11. However, by adding a certain amount of the 100 kc./sec. voltage directly from the modulator 11, a composite signal is obtained that is amplitude modulated at the Doppler frequency and that has a wave form as shown in FIG. 12. The peak modulation is a direct measure of $E_{HP}$, and this may be obtained as a unidirectional voltage by applying the signal to an amplitude detector. The output of the amplitude detector will be a sine wave at the Doppler frequency. This signal is then applied to a peak rectifier which will yield a direct current or unidirectional voltage that is a direct measure of $E_{HP}$.

FIG. 13 shows a block diagram of another embodiment of the radar system of the present invention that incorporates means to accommodate or correct for the incidental amplitude modulation of the transmitter signal as described above. In this embodiment of the invention an adder is included with the amplifier 16 that adds a signal from the frequency modulator 11 to the signal at the output of the amplitude detector 15. The signal from the modulator 11 should be shifted in phase by 90° by means of a conventional phase shifter that can be included with the adder and amplifier, in order to properly add the signal to the output of the amplitude detector 15. The output of the adder and amplifier 16 is fed to high pass filter 17. The composite signal shown in FIG. 12 will be produced at the output of this high pass filter. This signal is then fed to a Doppler detector 26 which detects the Doppler component of the signal shown in FIG. 12. The Doppler detector 26 is an amplitude detector that is constructed and arranged to detect the envelope of the signal shown in FIG. 12, which, as explained, is a sine wave at the Doppler frequency. The output from the Doppler detector is then fed to peak rectifier 21 that, as previously explained, produces a unidirectional output voltage having a value of $E_{HP}$.

The output from the adder amplifier 16 is also fed to a low pass filter 18 that filters out all signals at the modulation frequency of 100 kc./sec. or above, and permits the passing of the Doppler component. The output from the low pass filter 18 is then applied to the frequency meter 24, as in FIG. 9, to give an indication of range rate or relative speed. The output from the low pass filter 18 is also applied to the peak rectifier 22, the output of which is a unidirectional voltage having a value of $E_{TP}$ as explained previously. As in the embodiment shown in FIG. 9, the outputs of the peak rectifiers 21 and 22, $E_{HP}$ and $E_{TP}$, are then fed to ratio meter 23 that gives an indication of range.

Another embodiment of the invention is shown in FIG. 14. This embodiment of the invention is similar to that shown in FIG. 13 in that it is capable of compensating or correcting for a certain amount of incidental amplitude modulation of the transmitted signal, however, in this embodiment the adder and amplifier 16 of FIG. 13 is replaced by an adder and an amplifier having a delayed automatic gain control. These components are designated by the numeral 31. In this embodiment of the invention the unidirectional voltage $E_{TP}$ is used for controlling the gain of the amplifier. This is accomplished by connecting the low pass filter 18 to the output of the adder and amplifier with delayed automatic gain control, by connecting the peak rectifier 22 to the output of the low pass filter 18, and by connecting the output of the peak rectifier 22 to the automatic gain control circuit of the amplifier. With suitable loop-gain it is possible in arrangements such as this to keep the $E_{TP}$ voltage essentially constant and equal to a threshold voltage that must be reached before the automatic gain control circuit starts to control the gain of the amplifier. Consequently, the magnitude of the unidirectional voltage representing $E_{HP}$ will represent the $E_{HP}/E_{TP}$ ratio, and will thereby represent range directly. Thus in this embodiment of the invention the ratio meter 23 shown in the embodiments of FIG. 9 and FIG. 13 may be eliminated since the peak rectifier 21 connected to Doppler detector 26 will give a reading that is a direct measurement of range.

The radar system of the present invention contains certain additional advantages over conventional continuous wave radar systems in that the relative phase between the modulation on the signal shown in FIGS. 10, 11 and 12, and the Doppler signal proper changes by 180° when the relative speed reverses. This may be understood or visualized from a study of the vector relations of FIG. 3, keeping in mind that reversal of relative speed means reversing the direction of the average rotation of the $x/y$ vector. This 180° phase reversal provides a simple means of immediate recognition of the direction of relative speed. Such an effect is not available in conventional continuous wave or Doppler radar, and as a consequence, it is not possible in the conventional systems to determine the direction of relative speed directly.

Although not limited thereto, the continuous wave radar systems of the present invention are particularly well suited and were developed for obstacle detection in automotive vehicles, and representative values of the modulation rate or frequency, the carrier frequency and the maximum Doppler frequency expected to be received have been given by way of example only in relation to radar systems employed in automotive obstacle detection. If the system were to be employed for other purposes, such as, the determination of range and range rate of aircraft, then the representative frequencies given would need to be modified to accommodate for the much larger ranges and range rates between the aircraft and the system.

It can be appreciated from an inspection of FIG. 5, that if the Doppler component of the composite signal should go to zero as a result of the relative speed, or range rate, going to zero, that the systems described would not give an indication of range since $E_{TP}$ would become essentially zero. This is no particular problem in practice, however, since the Doppler component will be present even for very small relative speeds. For example, with a radar system for obstacle detection in automotive vehicles, the Doppler component will be present when the range changes by only a few wave lengths of the transmitted signal. This wave length may be 0.9 cm., as discussed above, so that a range indication will be present when range between the system and the target changes by only a few centimeters. In addition, equipment could be provided to record the range reading, when the range rate goes to zero, until such time as the range rate again becomes sufficient to provide a range indication by the system.

This feature provides a distinct advantage in certain applications for example, where it is desirable to detect a moving target among a multitude of stationary radar reflectors, and to secure range and range rate information on this target. Assuming, that the radar system is stationary, it would not give a range reading on any stationary radar reflectors but would provide information only on a target that is moving relative to the system.

The radar systems of the present invention are also capable, by reason of the features described above, of measuring range and range rate between the system and a moving target located among a multitude of radar reflectors when the moving target has a relative speed with respect to the system that is different from the other radar reflectors.

The radar systems of the present invention may be used for any application as long as the modulation repetition rate is greater, for example, 10 times greater, as in the obstacle detector for automobiles discussed above, than the maximum Doppler frequency expected to be received.

Although the radar system of the present invention has been indicated in the block diagrams as employing a frequency modulator, designated by the numeral 11, the system can be used equally well with a phase modulator, with these two types of modulation bearing the generic title of "angle modulation."

FIG. 15 discloses a diagram of a means for setting the frequency of transmission for the radar systems of the present invention mounted in automotive vehicles for employment as obstacle detectors. It is well known that radiation of microwave energy is closely controlled by Federal regulation, and for this reason a condition imposed upon radar systems employed in automotive obstacle detection is that they must require only a limited part of the microwave spectrum. Since there are many cars on the road it is obviously necessary that when two cars meet there should be no interference between the radar systems mounted on the two vehicles. This requires that the two vehicles operate on different wave lengths, which, offhand might suggest that each and all obstacle detection systems must operate on exclusive frequencies. There is, however a relatively simple solution to this problem. The operating frequencies of the obstacle detection systems can be made to change with the compass direction of the car, for example, as indicated in FIG. 15, cars proceeding in a northerly direction, plus or minus 60°, would use one frequency; cars going WSW, plus or minus 60°, would use another frequency, and cars going ESE, plus or minus 60°, would use a third frequency. Such an arrangement will assure that no two vehicles that are proceeding in opposite directions and that are about to meet on the roadway, will be operating on the same frequency. With such an arrangement, only three exclusive frequency bands are required to accommodate any desired number of cars with the obstacle detection radar system as described.

Thus, the present invention provides a continuous wave radar system that is capable of measuring range and range rate with a high degree of accuracy, and that employs only a very narrow transmission bandwith compared with prior art devices. Furthermore, the continuous wave radar system of the present invention may be suitably employed as an obstacle detector for automotive vehicles.

It will be understood that the invention is not to be limited to the exact construction shown and described, but that various changes and modifications may be made without departing from the spirit and scope of the invention as defined in the appended claims.

I claim:

1. A radar system for measuring range between the system and a target having relative velocity with respect to the system comprising, a transmitting means, modulating means connected to said transmitting means for angle modulating said transmitting means at a repetition rate greater than the maximum Doppler frequency expected to be received, means for receiving and combining a signal transmitted by said transmitting means and a signal reflected from the target, detecting means connected to said last mentioned means for producing an output signal having a component due to the angle modulation, and means connected to said detecting means for measuring the ratio of the peak amplitudes of the component due to the angle modulation and the total output signal from said detecting means.

2. A radar system for measuring range between the system and a target having relative velocity with respect to the system comprising, a transmitting means, modulating means connected to said transmitting means for angle modulating said transmitting means at a repetition rate greater than the maximum Doppler frequency expected to be received, means for receiving and combining a signal transmitted by said transmitting means and a signal reflected from the target, detecting means connected to said last mentioned means for producing a signal containing a component due to the angle modulation and a Doppler component, and means connected to said detecting means for measuring the ratio of the peak amplitudes of the component due to the angle modulation and the Doppler component.

3. A radar system for measuring range between the system and a target having relative velocity with respect to the system comprising, a transmitting means, modulating means connected to said transmitting means for angle modulating said transmitting means at a repetition rate greater than the maximum Doppler frequency expected to be received, means for receiving and combining a signal transmitted by said transmitting means and a signal reflected from the target, detecting means connected to said last mentioned means for producing a signal containing a component due to the angle modulation and a Doppler component, amplifier means including a feedback circuit for producing a signal that is a function of the ratio of the amplitudes of the component due to the angle modulation and the Doppler component, said amplifier means connected to said detecting means, and means connected to said amplifier means for measuring the peak amplitude of said last mentioned signal.

4. A radar system for measuring range and range rate between the system and a target having relative velocity with respect to the system comprising, a transmitting means, modulating means connected to said transmitting means for angle modulating said transmitting means at a repetition rate substantially greater than the maximum Doppler frequency expected to be received, means for receiving and combining a signal transmitted by said transmitting means and a signal reflected from the target, detecting means connected to said last mentioned means for producing an output signal having a component due to the angle modulation and a Doppler component, means connected to said detecting means for measuring the ratio of the peak amplitudes of the component due to the angle modulation and the total output signal from said detecting means, and means connected to said detecting means for measuring the frequency of the Doppler component.

5. A radar system for measuring range and range rate between the system and a target having relative velocity with respect to the target comprising, a transmitting means, modulating means connected to said transmitting means for angle modulating said transmitting means at a repetition rate substantially greater than the maximum Doppler frequency expected to be received, means for receiving and combining a signal transmitted by said transmitting means and a signal reflected from the target, detecting means connected to said last mentioned means for producing a signal having a component due to the angle modulation and a Doppler component, means connected to said detecting means for measuring the ratio of the peak amplitudes of the component due to the angle modulation and the Doppler component, and means connected to said detecting means for measuring the frequency of the Doppler component.

6. A radar system for measuring range and range rate between the system and a target having relative velocity with respect to the target comprising, a transmitting means, modulating means connected to said transmitting means for angle modulating said transmitting means at a repetition rate substantially greater than the maximum Doppler frequency expected to be received, means for receiving and combining a signal transmitted by said transmitting means and a signal reflected from the target, detecting means connected to said last mentioned means for producing a signal containing a component due to the angle modulation and a Doppler component, amplifier means connected to said detecting means for producing a signal that is a function of the ratio of the amplitudes of the component due to the angle modulation and the Doppler component, means connected to said amplifier means for measuring the peak amplitude of said last mentioned signal, and means connected to said amplifier means for measuring the frequency of the Doppler component.

7. A radar system for measuring range between the system and a target having relative velocity with respect to the system comprising, a transmitting means, modulating means operable to angle modulate said transmitting means at a repetition rate greater than the maximum Doppler frequency expected to be received, signal adding means operable to vectorially add a signal transmitted by said transmitting means with a signal reflected from the target, an amplitude detector connected to said signal adding means, an amplifier connected to said amplitude detector, a high pass filter connected to said amplifier, a first peak rectifier connected to said amplifier, a second peak rectifier connected to said high pass filter, and a ratio meter connected to said first and second peak rectifiers for indicating the range between the system and the target.

8. A radar system for measuring range and range rate between the system and a target comprising, a transmitting means, modulating means operable to angle modulate said transmitting means at a repetition rate greater than the maximum Doppler frequency expected to be received, signal adding means operable to vectorially add a signal transmitted by said transmitting means with a signal reflected from the target, an amplitude detector connected to said signal adding means, a low pass filter and a high pass filter connected in parallel and to said amplitude detector, a frequency meter connected to said low pass filter for indicating relative speed between the system and the target, a first peak rectifier connected to said amplitude detector, a second peak rectifier connected to said high pass filter, and a ratio meter connected to said first and said second peak rectifiers for indicating the range between the system and the target.

9. A radar system for measuring range between the system and a target having relative velocity with respect to the system comprising, a transmitting means, modulating means operable to angle modulate said transmitting means at a repetition rate greater than the maximum Doppler frequency expected to be received, signal combining means operable to combine a signal transmitted by said transmitting means with a signal reflected from the target, an amplitude detector connected to said signal combining means, a low pass filter and a high pass filter connected in parallel and to said amplitude detector, a first peak rectifier connected to said low pass filter, a second peak rectifier connected to said high pass filter, and a ratio meter connected to said first peak rectifier and said second peak rectifier for indicating range between the system and the target.

10. A radar system for measuring range and range rate between the system and a target comprising, a transmitting means, modulating means operable to angle modulate said transmitting means at a repetition rate greater than the maximum Doppler frequency expected to be received, signal combining means operable to combine a signal transmitted by said transmitting means with a signal reflected from the target, an amplitude detector connected to said signal combining means, a low pass filter and a high pass filter connected in parallel and to said amplitude detector, a frequency meter connected to said low pass filter for indicating the range rate between the system and the target, a first peak rectifier connected to said low pass filter, a second peak rectifier connected to said high pass filter, and a ratio meter connected to said first peak rectifier and said second peak rectifier for indicating range between the system and the target.

11. A radar system for measuring range between the system and a target having relative velocity with respect to the system comprising, a transmitting means, modulating means for angle modulating said transmitting means at a rate greater than the maximum Doppler frequency expected to be received, signal combining means operable to combine a signal transmitted by said transmitting means and a signal reflected from the target, detecting means connected to said signal combining means for producing a signal having a Doppler component and a component due to the angle modulation, adding means for adding a signal from said modulating means to the output signal from said detecting means, a low pass filter connected to said adding means, a first peak rectifier connected to said low pass filter, a high pass filter connected to said adding means, means for detecting the Doppler component connected to said high pass filter, a second peak rectifier connected to said means for detecting the Doppler component, and a ratio meter connected to said first peak rectifier and said second peak rectifier for indicating range between the system and the target.

12. A radar system for measuring range and range rate between the system and a target comprising, a transmitting means, modulating means for angle modulating said transmitting means at a rate greater than the maximum Doppler frequency expected to be received, signal combining means operable to combine a signal transmitted by said transmitting means and a signal reflected from the target, detecting means connected to said signal combining means for producing a signal having a Doppler component and a component due to the angle modulation, adding means for adding a signal from said modulating means to the output signal from said detecting means, a low pass filter connected to said adding means, a first peak rectifier connected to said low pass filter, a frequency meter also connected to said low pass filter for indicating range rate between the system and the target, a high pass filter connected to said adding means, means for detecting the Doppler component connected to said high pass filter, a second peak rectifier connected to said means for detecting the Doppler component, and a ratio meter connected to said first peak rectifier and said second peak rectifier for indicating range between the system and the target.

13. A radar system for measuring range between the system and a target having relative velocity with respect to the system comprising, a transmitting means, modulating means for angle modulating said transmitting means at a rate greater than the maximum Doppler frequency expected to be received, signal combining means operable to combine a signal transmitted by said transmitting means and a signal reflected from the target, detecting means connected to said signal combining means for producing a Doppler component and a component due to the angle modulation, adding means for adding a signal from said modulating means to the output signal from said detecting means, an amplifier having delayed automatic gain control connected to said adder, a low pass filter connected to said amplifier, a first peak rectifier connected to said low pass filter, the output from said first peak rectifier being connected to said amplifier to control the gain thereof, a high pass filter connected to said amplifier, means connected to said high pass filter for detecting the Doppler component, and a second peak rectifier connected to said last mentioned means for indicating range between the system and the target.

14. A radar system for measuring range and range rate between the system and a target comprising, a transmitting means, modulating means for angle modulating said transmitting means at a rate greater than the maximum Doppler frequency expected to be received, signal combining means operable to combine a signal transmitted by said transmitting means and a signal reflected from the target, detecting means connected to said signal combining means for producing a Doppler component and a component due to the angle modulation, adding means for adding a signal from said modulating means to the output signal from said detecting means, an amplifier having delayed automatic gain control connected to said adder, a low pass filter connected to said amplifier, a frequency meter connected to said low pass filter for indicating range rate between the system and the target, a first peak rectifier also connected to said low pass filter, the output of said first peak rectifier being connected to said amplifier with delayed automatic gain control for controlling the gain thereof, a high pass filter connected to said amplifier, means connected to said amplifier for detecting the Doppler component, and a second peak rectifier connected to said last mentioned means for indicating range between the system and the target.

References Cited by the Examiner
UNITED STATES PATENTS

| | | | |
|---|---|---|---|
| 2,451,822 | 10/48 | Guanella | 343—9 |
| 2,533,889 | 12/50 | Keizer | 343—12 |
| 3,108,273 | 10/63 | Erst | 343—14 |

CHESTER L. JUSTUS, *Primary Examiner.*
KATHLEEN CLAFFY, *Examiner.*